US005943122A

United States Patent [19]
Holmes

[11] Patent Number: 5,943,122
[45] Date of Patent: Aug. 24, 1999

[54] INTEGRATED OPTICAL MEASUREMENT INSTRUMENTS

[75] Inventor: Duane C. Holmes, Saratoga, Calif.

[73] Assignee: Nanometrics Incorporated, Sunnyvale, Calif.

[21] Appl. No.: 09/113,610

[22] Filed: Jul. 10, 1998

[51] Int. Cl.[6] .............................. G01J 3/02; G01N 21/17
[52] U.S. Cl. ............................ 356/73; 356/51; 356/319; 356/328; 250/339.07; 250/339.08
[58] Field of Search .................................. 356/72, 73, 51, 356/319, 326, 328; 250/339.07, 339.08

[56] References Cited

PUBLICATIONS

J.N. Cox et al., "FTIR spectrophotometry for thin film monitors: computer and equipment integration for enhanced capabilities", SPIE vol. 1392 Advanced Techniques for Integrated Circuit Processing (1990), pp. 650–659.

William A. McGahan et al., "Combined Spectroscopic Ellipsometry and Reflectometry for Advanced Semiconductor Fabrication Metrology", SPIE—The International Society for Optical Engineering, SPIE vol. 2877, Oct. 16–17, 1996, Austin, Texas, 10 pages.

Metrology that Measures Up, Apr. 1997, Solid State Technology, p. 83.

Moore Technologies Web Site (http://www.mooretech.com/metrology.htm), Metrogy That Measures Up!, Metrology Systems, 2 pages.

MIR 8000™ Modular IR Fourier Spectrometer, Oriel Instruments Brochure, pp. 1–10.

The Illuminator, Midac Corporation Brochure, 2 pages.

*Primary Examiner*—F. L. Evans
*Attorney, Agent, or Firm*—Skjerven, Morrill MacPherson, Franklin & Friel LLP; Michael J. Halbert

[57] ABSTRACT

A measuring instrument with a parfocal combination of an ultra-violet to near-infrared (UV-NIR) spectrophotometer and a Fourier Transform Infrared (FTIR) spectrometer is disclosed. The parfocal configuration of metrology tools obviates lateral movement of the sample between two separate measurement instruments. Consequently, the area occupied by the parfocal measuring instrument is reduced. Moreover, throughput is increased because there is no need to reposition the sample to properly align the measurement area for the separate measurements. The measuring instrument also includes an imaging apparatus, such as a camera or microscope ocular, to accurately position the measurement area of the sample. Beam directing elements, such as a mirror and objective lenses, are mounted on a common movable member. The common movable member, which may be, e.g., a linear or rotating turret, moves to properly align the desired beam directing element, thereby selecting the specific metrology mode. In addition, the measurement instrument includes a purging shroud along the FTIR spectrometer optical path to efficiently purge any atmospherical gases that may interfere with the FTIR measurement technique.

26 Claims, 7 Drawing Sheets

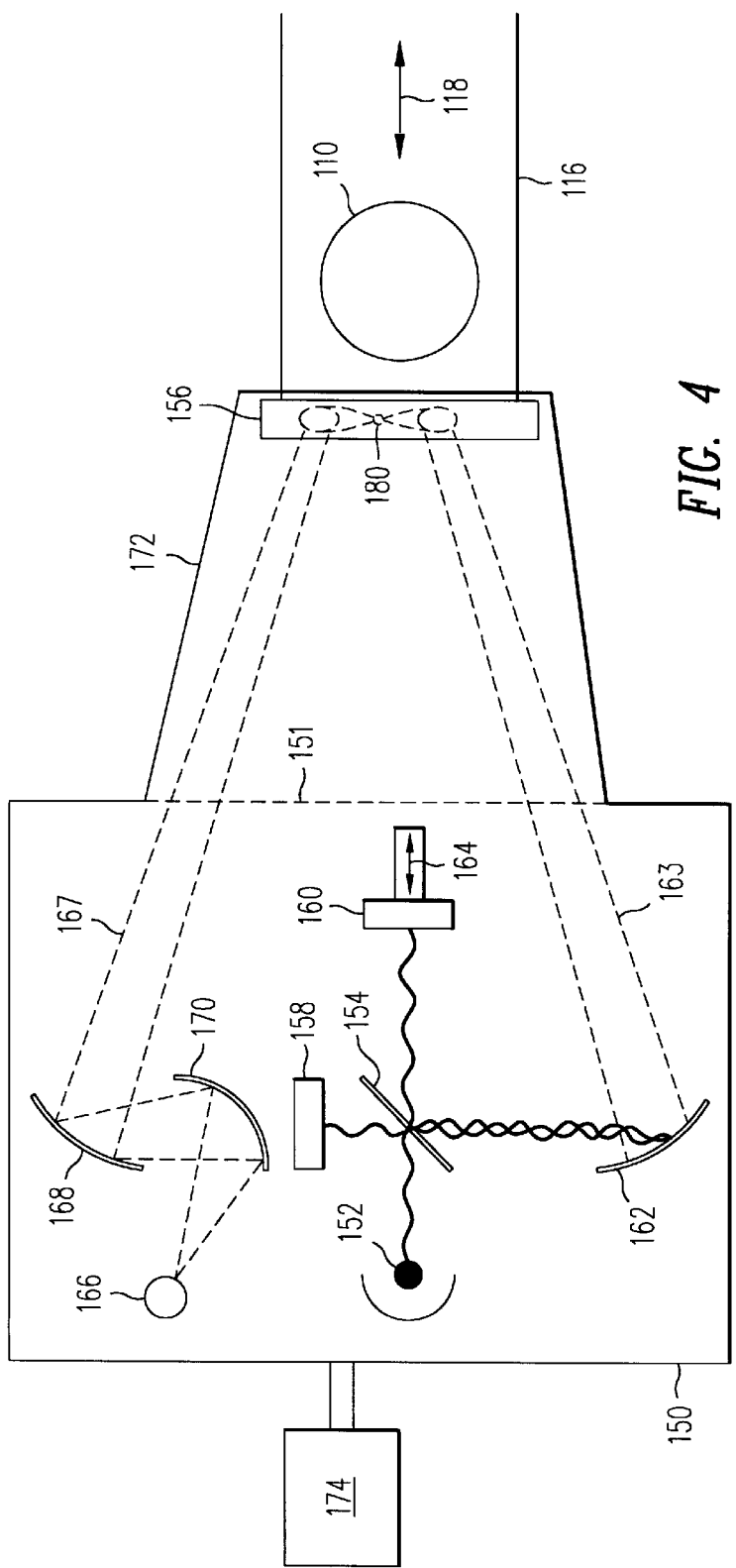
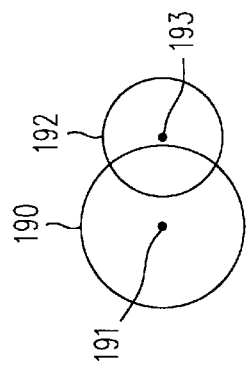
FIG. 5C
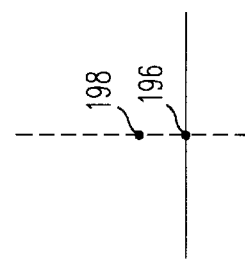
FIG. 5B
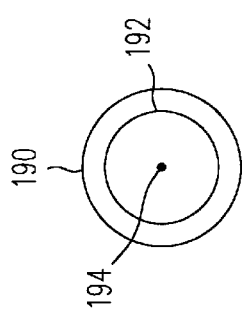
FIG. 5A
FIG. 4

5,943,122

INTEGRATED OPTICAL MEASUREMENT INSTRUMENTS

FIELD OF THE INVENTION

The present invention relates to optical measurement instruments that inspect and measure surface, thin-film, or bulk properties of a sample using one or more wavelengths of light, and more particularly to combining a spectrophotometer and a Fourier Transform Infrared spectrometer into a compact integrated tool.

BACKGROUND

Spectrophotometers operating in various portions of the ultra-violet through near infrared wavelength range, and Fourier Transform Infrared spectrometers operating in the longer infrared wavelength range are well-known metrology tools useful in a variety of scientific or technological fields, for example, biology, geology, forensics, nutrition science, medicine, and semiconductor processing.

Spectrophotometers are instruments for measuring spectral transmittance or reflectance properties of a sample. Typically, spectrophotometers use a diffraction grating or prism to separate light into a spatially distributed spectrum. The spatially distributed spectrum of light is used to generate an intensity profile of a sample. Measurement and analysis of the intensity profile yields information about the sample or an overlying film including transmittance, reflectance, index of refraction, and thickness. The wavelengths of light typically used by a spectrophotometer falls in the ultra-violet (UV), about 0.2 micrometer ($\mu$m), through the near-infrared (NIR), about 1.5 $\mu$m, which encompasses the visible (VIS) range.

In the measurement of film-thickness using a UV-NIR spectrophotometer, the film must be at least partially transparent to the particular wavelengths of light being used. Light is reflected from both the front and rear surfaces of the film. Depending on the wavelength of light, the film's index of refraction, and the thickness of the film, the reflected light rays will combine, constructively, destructively or somewhere in between, in the plane of the displayed or detected spectrum. Thus, a ripple or fringe pattern is generated. From the exact shape of the fringe pattern, the thickness of the film can be determined. With a thicker film, there is a greater number of fringes in the spectral pattern relative to a spectral pattern of a thinner film. However, because spectrophotometers have a spectral resolution limit, there is a film-thickness above which a spectrophotometer cannot effectively resolve the fringe pattern. Consequently, the UV-NIR spectrophotometer may be unsuitable to analyze a thick film. Further, some materials are opaque in all or some of the wavelengths in the UV to NIR range. Thus, the UV-NIR spectrophotometer is also unsuitable to measure these materials.

One solution to the problems posed by materials that are opaque in the UV to NIR range or too thick for a UV-NIR spectrophotometric measurement is to extend the wavelength range into the infrared (IR) region. Hence, a Fourier Transform Infrared spectrometer is often used for thick-film thickness measurements.

A Fourier Transform Infrared (FTIR) spectrometer uses a Michelson interferometer, which includes an IR source, a beam splitter, and two plane mirrors (one fixed and one moving) and after mathematical processing produces a spectrum of the light coming from the sample. A FTIR spectrometer is particularly useful at IR wavelengths from about 2 $\mu$m to 1 mm. A FTIR spectrometer detects the absorption of the IR light that is either transmitted through or reflected by the sample. In the IR range, absorption of light is associated with molecular bonding and, thus, valuable compositional information can be obtained. Because the spectrum intensity variations can also be caused by interference effects of light reflecting from different interfaces, film-thickness information can also be extracted, including thicknesses much greater than may be measured with a UV-NIR spectrophotometer.

Commercially available FTIR spectrometers are typically self-contained, bench-top systems that require transferring a sample onto a dedicated inspection location, such as an enclosed sample chamber. Purging of the FTIR optical path with an inert gas is typically performed to eliminate atmospheric water-vapor and carbon dioxide that can cause major absorption peaks in FTIR spectra. Thus, FTIR spectrometers are often enclosed chambers. Examples of FTIR spectrometers are the Century Series FT-IR Spectrometers made by Bio-Rad located in Cambridge, Mass., the Epitaxial Layer Thickness Monitor MappIR by PIKE Technologies, located in Madison Wis., the MB Series of FTIR Spectrometers by Bomem, located in Quebec, Canada, the Genesis Series FTIR by Mattson, located in Madison, Wis., the M-Research Series and SPR Prospect IR spectrometer by Midac Corporation, located in Irvine Calif.

Obtaining results using a UV-NIR spectrophotometer and FTIR spectrometer requires having two separate, dedicated instruments with, of course, sufficient table or floor space to accommodate both. Separate UV-NIR spectrophotometer and FTIR spectrometer measurements of the same sample area are desirable, for example, where composite thick and thin films are present over the sample area or where information relating to different characteristics of the sample area are desired, such as film thickness and compositional information.

FIGS. 1A and 1B are schematic diagrams of a UV-NIR spectrophotometer 10 alongside a FTIR spectrometer 20. As shown in FIG. 1A, a sample 14 is positioned under the axis 12 of spectrophotometer 10. Sample 14 is on a stage 16 that is used to precisely position sample 14 under axis 12 as well as reposition sample 14 under axis 22 of FTIR spectrometer 20 (sample 14 is shown located under axis 22 by broken lines). FIG. 1B similarly shows sample 14 under axis 12. However, two separate stages 18, 28 are used to correctly position sample 14 under respective axes 12 and 22. Thus, a mechanism to transfer sample 14 from stage 18 to stage 28 is required. Thus, the use of spectrophotometer 10 alongside FTIR spectrometer 20 requires the use of a large stage 16 (as shown in FIG. 1A) or moving sample 14 from stage 18 to separate stage 28 (as shown in FIG. 1B). The task of moving sample 14 from one instrument to the other and finding and positioning the same measurement area of sample 14 under axes 12 and 22 is difficult and time-consuming, which consequently reduces throughput.

Further, the use of either one large stage 16 or multiple stages 18 and 28 requires a large amount of space. However, in semiconductor processing, the minimization of the footprint of a clean room tool is important because of the high fabrication and maintenance costs per square foot in a clean room. Consequently, the use of completely separate spectrophotometer and FTIR spectrometer instruments in a clean room is undesirable because of the space required. Using a large stage or multiple stages is undesirable because of higher material costs, as well as the time required to reposition the sample under each instrument. Moreover, the data correlation for the areas measured by the separate devices is limited by the accuracy with which the sample area can be repositioned in the subsequent metrology instrument.

Combining spectrophotometer 10 and FTIR spectrometer 20 is difficult because the units use different hardware, such as different light sources, i.e., UV-NIR sources versus an IR source, and different detectors, along with different techniques for analysis. Additionally, FTIR spectrometer 20 is typically contained within a sealed enclosure (not shown) to eliminate atmospheric interferences that may cause unreliable and inaccurate results. Moreover, spectrophotometer 10 and FTIR spectrometer 20 are typically used for separate types of measurements, e.g., among other characteristics of the sample spectrophotometer 10 measures thin film thicknesses, while FTIR spectrometer 20 measures thick film thicknesses. Spectrophotometer 10 and FTIR spectrometer 20 are typically not used to measure the thickness of the same layer within the same area of a sample.

Thus, a combined spectrophotometer and spectrometer unit that reduces sample handling costs, minimizes the horizontal area occupied by the resulting apparatus, and increases throughput as well as data correlation is needed.

SUMMARY

A measurement instrument used for the characterization and measurement of surface, thin-film, and bulk properties of a sample includes a spectrophotometer that measures a first area of the sample and a spectrometer that measures a second area of the sample, where the first area and second area overlap. Thus, the spectrophotometer and spectrometer may measure the characteristics of the sample at the same area while the sample remains essentially stationary, i.e., little or no lateral movement of the sample is required to measure approximately the same area on the sample. The spectrophotometer uses light in some portion of the UV-through-NIR wavelength range, while the spectrometer, such as a FTIR spectrometer, uses light in the IR wavelength range.

The measurement areas of the spectrophotometer and the FTIR spectrometer may be focused on approximately the same area on the sample, and thus are in a parfocal configuration, i.e., having coincident focal points. In some embodiments, it may be desired to change the focal point of either the spectrophotometer or FTIR spectrometer. Where the point of focus is changed, the measurement area on the sample for both metrology instruments may still be approximately located on the same vertical axis, and thus the spectrophotometer and FTIR spectrometer are in a parcentric arrangement, i.e., the focal points or measurement areas approximately fall on the same vertical axis. Further, the focal points of the spectrophotometer and FTIR spectrometer may simply overlap or touch, and thus the same area of the sample may be measured by both metrology instruments with only minimal movement of the sample.

The advantageous combination of the spectrophotometer and FTIR spectrometer in accordance with the present invention permits a significant reduction in the size of or the number of sample manipulations, as well as the minimization of the horizontal area occupied by the resulting apparatus. Different characteristics of one sample area may be measured using both a spectrophotometer and a FTIR spectrometer with no need to reposition the sample between the separate metrology instruments and realign the measurement point. Thus, the throughput, as well as the data correlation for different measurements, is increased.

The spectrophotometer includes an UV-NIR source and a spectrophotometer detector that may be positioned relative to the sample to permit reflectance measurements and/or transmission measurements. Likewise, the FTIR spectrometer includes an IR source and a FTIR spectrometer detector that may be positioned relative to the sample to permit reflectance measurements and/or transmission measurements.

Beam directing elements, such as a mirror that is used with the FTIR spectrometer and one or more objective lenses that are used with spectrophotometer, are mounted on a common movable member. The common movable member, such as a linear or rotating turret, is moved to properly align the appropriate beam directing element, thereby selecting the desired metrology tool with the desired area of measurement.

An imaging apparatus, such as a camera or microscope ocular, is used with the present measurement instrument in a parfocal configuration with the spectrophotometer and FTIR spectrometer. Using the imaging apparatus, the sample can be positioned so that the desired feature on the sample can be measured. The sample is moved by a microprocessor controlled stage. Additionally, if desired, a plurality of viewing instruments may be used that can simultaneously view the desired feature on the sample.

Because atmospheric gases may interfere with the spectrometric measurement, a purging shroud connected to the FTIR spectrometer is used to direct the flow of purging gas along the optical path of the FTIR spectrometer.

BRIEF DESCRIPTION OF THE DRAWINGS

The above and other features, aspects, and advantages of the present invention will become better understood with regard to the following description, appended claims, and accompanying figures, where:

FIG. 4 shows a plan view of a FTIR spectrometer;

FIG. 5A shows a plan view of parcentric and/or parfocal measurement areas;

FIG. 5B shows a side view of a sample with a measurement areas focused at two different points on the same vertical axis;

FIG. 5C shows a plan view of overlapping measurement areas;

DETAILED DESCRIPTION

Figure 1A:
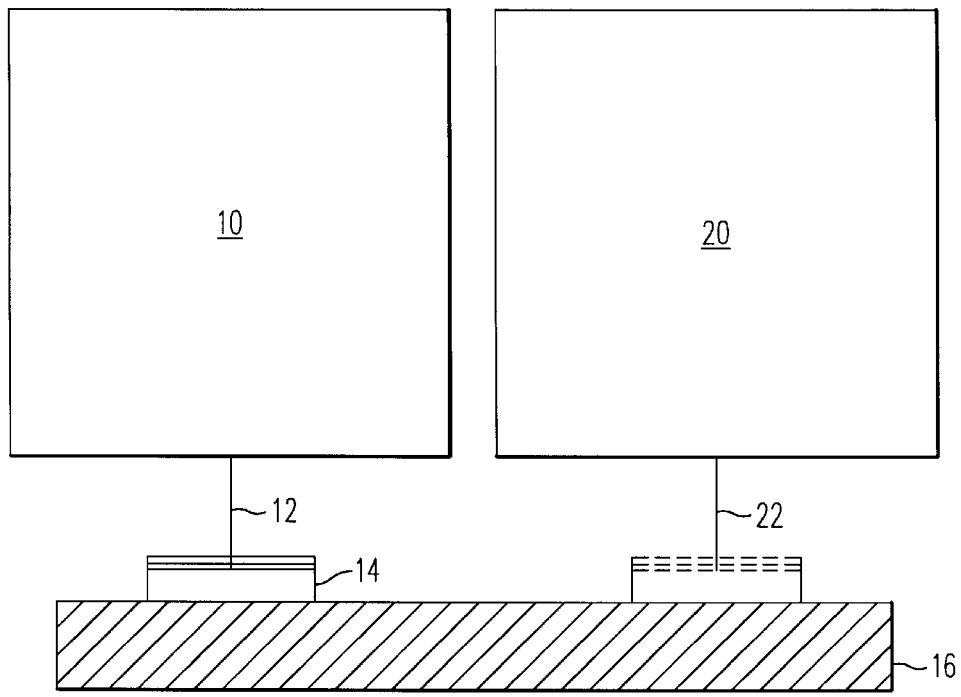
FIGS. 1A and 1B are schematic diagrams of a UV-NIR spectrophotometer alongside a FTIR spectrometer.
Figure 1B:
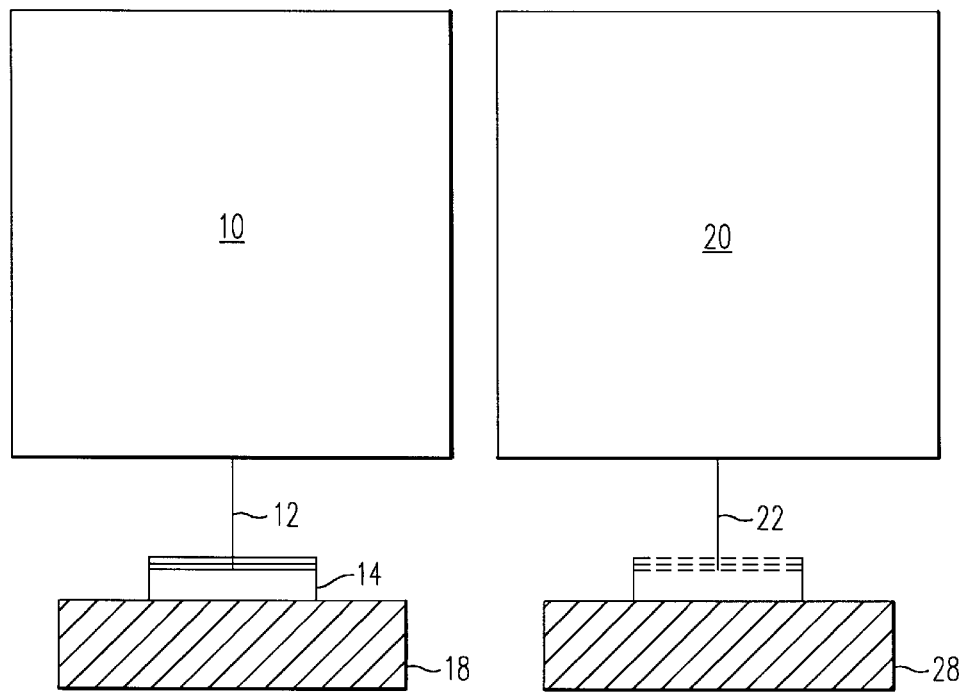
Figure 2:
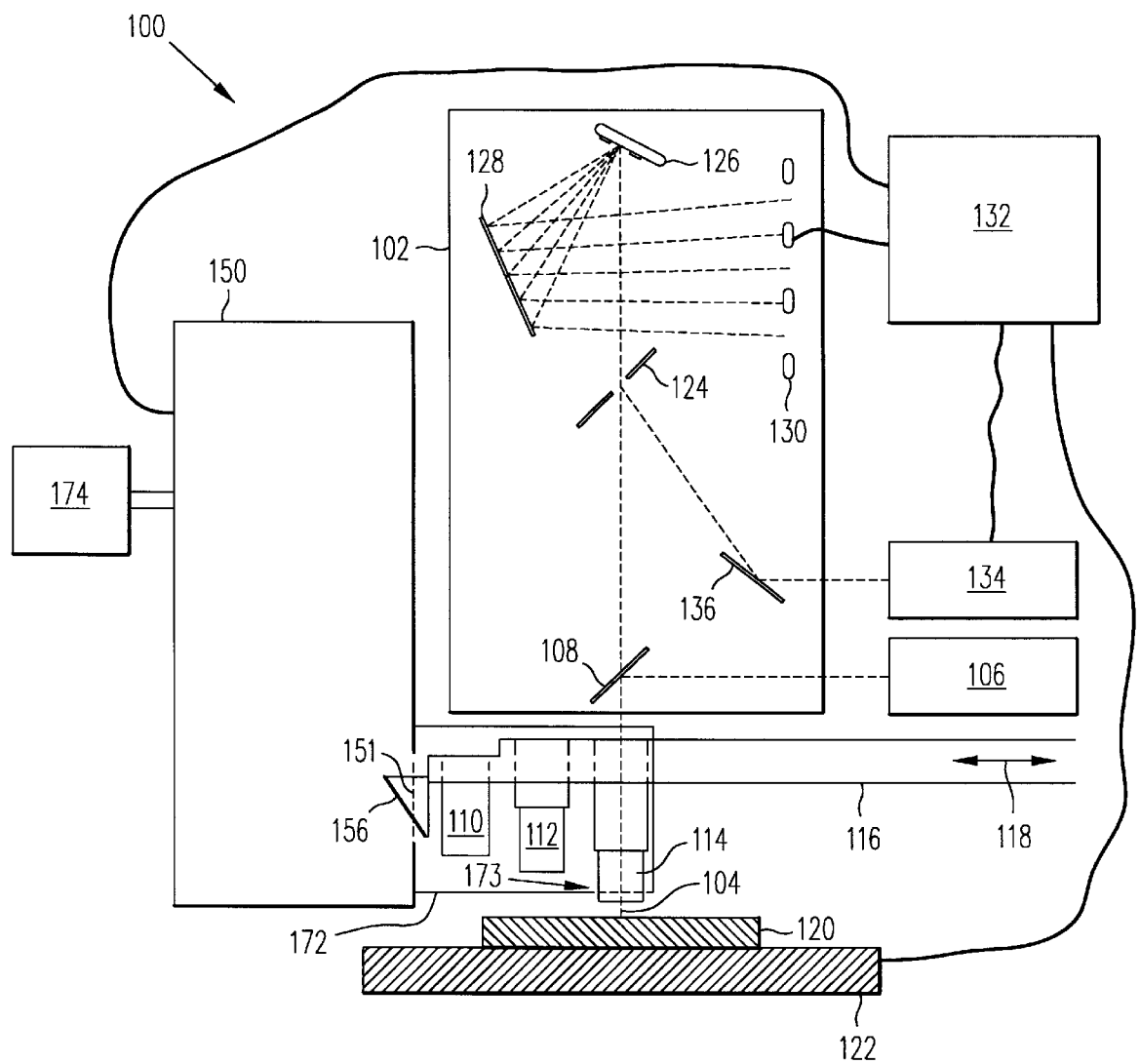
FIG. 2 shows a side view of a parfocal measuring instrument using a UV-NIR spectrophotometer and a FTIR spectrometer in a parfocal configuration, where the UV-NIR spectrophotometer is aligned with the measurement area on the sample.
Figure 3:
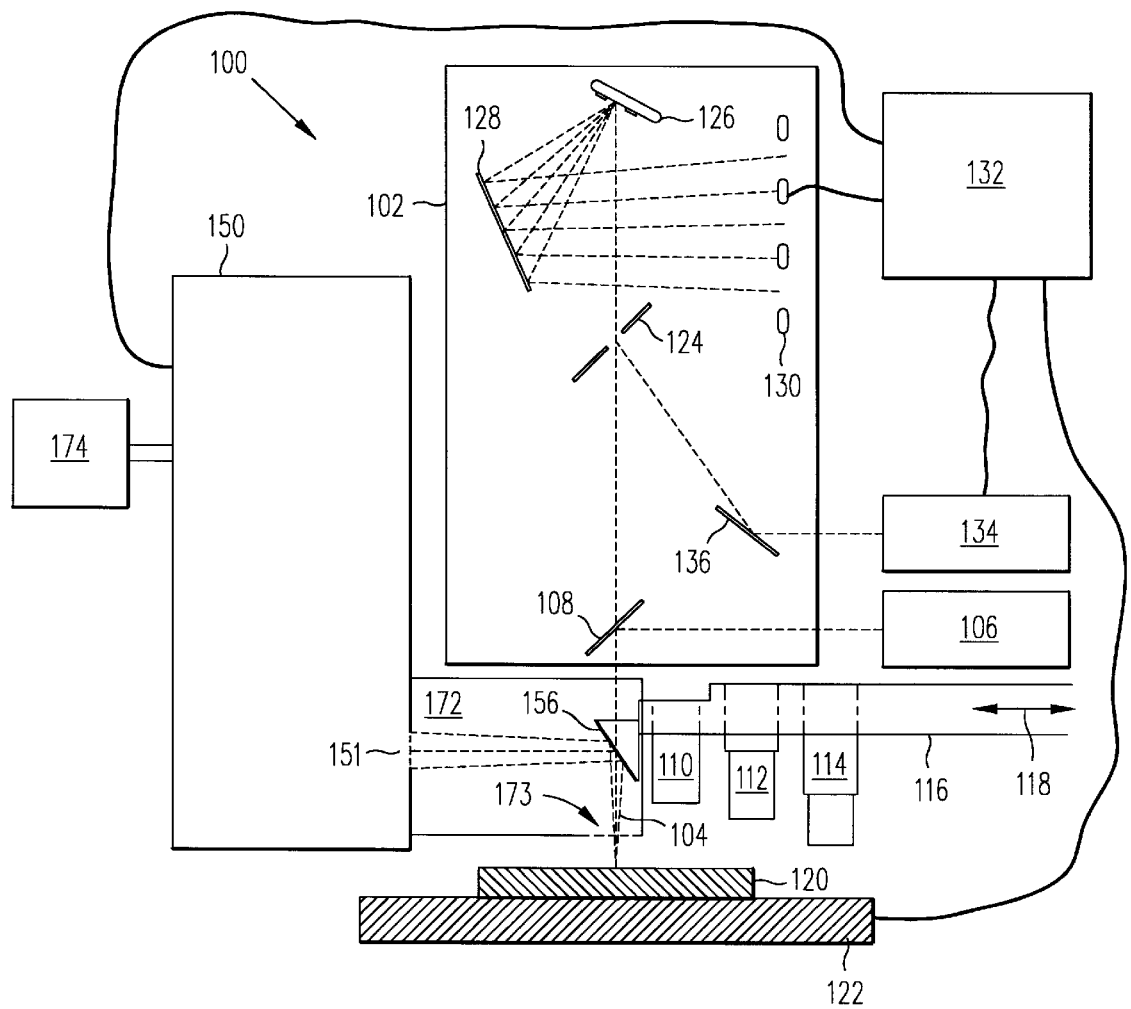
FIG. 3 shows a side view of a parfocal measuring instrument using a UV-NIR spectrophotometer and a FTIR spectrometer in a parfocal configuration, where the FTIR spectrometer is aligned with the measurement area on the sample.

FIGS. 2 and 3 show side views of a parfocal measuring instrument 100. Parfocal measuring instrument 100 includes an UV-NIR spectrophotometer 102 and a FTIR spectrometer 150. Parfocal measuring instrument 100 also includes beam directing elements mounted on a common movable member, such as linear turret 116. The beam directing elements include objective lenses 110, 112, and 114 that are used with spectrophotometer 102 and a mirror 156 that is used with FTIR spectrometer 150. Linear turret 116 is movable so that an objective lens, e.g., lens 114, may be aligned with the vertical axis 104, as shown in FIG. 2, or so that mirror 156, which redirects light to and from FTIR spectrometer 150, is aligned with vertical axis 104, as shown in FIG. 3. Thus, as shown in FIGS. 2 and 3, both the viewing axis of spectrophotometer 102 and the viewing axis of FTIR spectrometer 150 are coincident with vertical axis 104, and consequently, the areas on sample 120 measured by spectrophotometer 102 and FTIR spectrometer 150 are coincident. Sample 120 is mounted on a stage 122 that is conventionally controlled by a microprocessor 132 so that the desired measurement area on sample 120 is accurately positioned under vertical axis 104.

While the present disclosure discusses the use of a UV-NIR spectrophotometer and FTIR spectrometer, it should be understood that any spectral analysis instruments may be used in the present invention, with for example, the beam directing elements mounted on a common movable member.

Spectrophotometer 102 and FTIR spectrometer 150 are focused on approximately the same area on the sample, and thus are in a parfocal arrangement, i.e., having coincident focal points. In some embodiments, the focal point of either spectrophotometer 102 or spectrometer 150 may be adjusted along vertical axis 104, and thus the metrology instruments are in a parcentric arrangement, i.e., the focal points or measurement areas fall on the same vertical axis. In other embodiments, the measurement areas of spectrophotometer 102 and spectrometer 150 may overlap but have independent vertical axes. Using a parfocal, parcentric, or overlapping arrangement advantageously permits the minimization of the horizontal area occupied by the resulting apparatus and permits multiple measurements of approximately the same area while maintaining approximately the same position of sample 120.

As shown in FIG. 2, UV-NIR spectrophotometer 102 uses a light source 106, which may be external or internal to spectrophotometer 102. Light source 106 produces light in the UV, VIS, and NIR wavelengths, and may be comprised of an independent light source for each of the UV, VIS, and NIR wavelength ranges. The light (beam), shown as a broken line, is directed to a beam splitter 108, such as a half-silvered mirror, which redirects a fraction of the light, nominally at a right angle, to the entrance pupil of objective lens 114. FIGS. 2 and 3 show three objective lenses 110, 112, and 114, where objective lens 114 is shown aligned with vertical axis 104 in FIG. 2. Of course, objective lenses 110 and 112 may also be aligned with vertical axis 104. Objective lenses 110, 112, and 114 are used to focus the light from source 106 onto sample 120. Objective lenses 110, 112, and 114 have respective magnifications of 4×, 10× and 15×, however, it should be understood that any desired magnification may be used. In addition, the specific number of objective lenses shown in FIGS. 2 and 3 are illustrative and any desired number of objective lenses may be used.

Objective lenses 110, 112, and 114 are mounted on linear turret 116, along with mirror 156. Linear turret 116 is used to properly align one of the objective lenses 110, 112, and 114 with vertical axis 104 when a spectrophotometric measurement is desired, as shown in FIG. 2. Where a FTIR spectrometric measurement is desired, linear turret 116 aligns mirror 156 with vertical axis 104, as shown in FIG. 3. The linear motion of linear turret 116 is indicated by arrow 118. When linear turret 116 aligns objective lens 114 with vertical axis 104, mirror 156 may actually penetrate FTIR spectrometer 150 through an aperture 151 (shown as a broken line) in FTIR spectrometer 150, as shown in FIG. 2.

The light focused by objective lens 114 is either transmitted, absorbed, or reflected by sample 120. Light that is reflected by the surface of sample 120, or from subsurface interfaces of sample 120, proceeds back through objective lens 114, through beam splitter 108, and is focused onto a mirror 124, which has a small hole. As the image plane on mirror 124 is conjugate to the sample plane, the hole in mirror 124 permits some light to pass. The light that passes through the hole in mirror 124 is the light from the measurement area on sample 120 that is spectrophotometrically measured. Thus, the measurement area on sample 120 measured by spectrophotometer 102 is equal to the diameter of the hole, which is approximately 250 $\mu$m, divided by the magnification of the objective lens used. Thus, spectrophotometer 102 measures an area on sample 120 that is between 62 $\mu$m and 17 $\mu$m in diameter, assuming objective lenses 110, 112, and 114 have magnifications of 4×, 10× and 15×. Of course, with the use of different objective lenses and/or a different hole diameter in mirror 124, the measurement area on sample 120 may be altered.

The light that passes through the hole in mirror 124 proceeds to a diffraction grating 126 or other similar type dispersion apparatus, such as a prism. Diffraction grating 126 reflects the light spectrally onto a detection array 130 by way of intermediate mirror 128. Detection array 130 measures the intensity of light at each wavelength. Detection array 130 may be, for example, an apertured scanning photo detector or a stationary detector array such as a CCD array. A separate detector for light in the NIR wavelength range may be included within detection array 130. The spectral data acquired by detection array 130 is analyzed by microprocessor 132 to obtain the desired quantitative information about the area measured on sample 120. The programming of microprocessor 132 to analyze spectral data obtained from spectrophotometer 102 is well known to those of ordinary skill in the art.

While spectrophotometer 102, as described in the present disclosure, may be considered a "microspectrophotometer", it should be understood that other types of spectrophotometers may also be used in accordance with the present invention. Thus the inclusion of small or large area capabilities, by the use of lenses or mirrors as part of the spectrophotometer's optical path, is an acknowledged and expected implementation within the scope of the present invention. Further, it should be understood that if desired, only a portion of the wavelengths in the UV-NIR range may be used by spectrophotometer 102.

Figure 7:
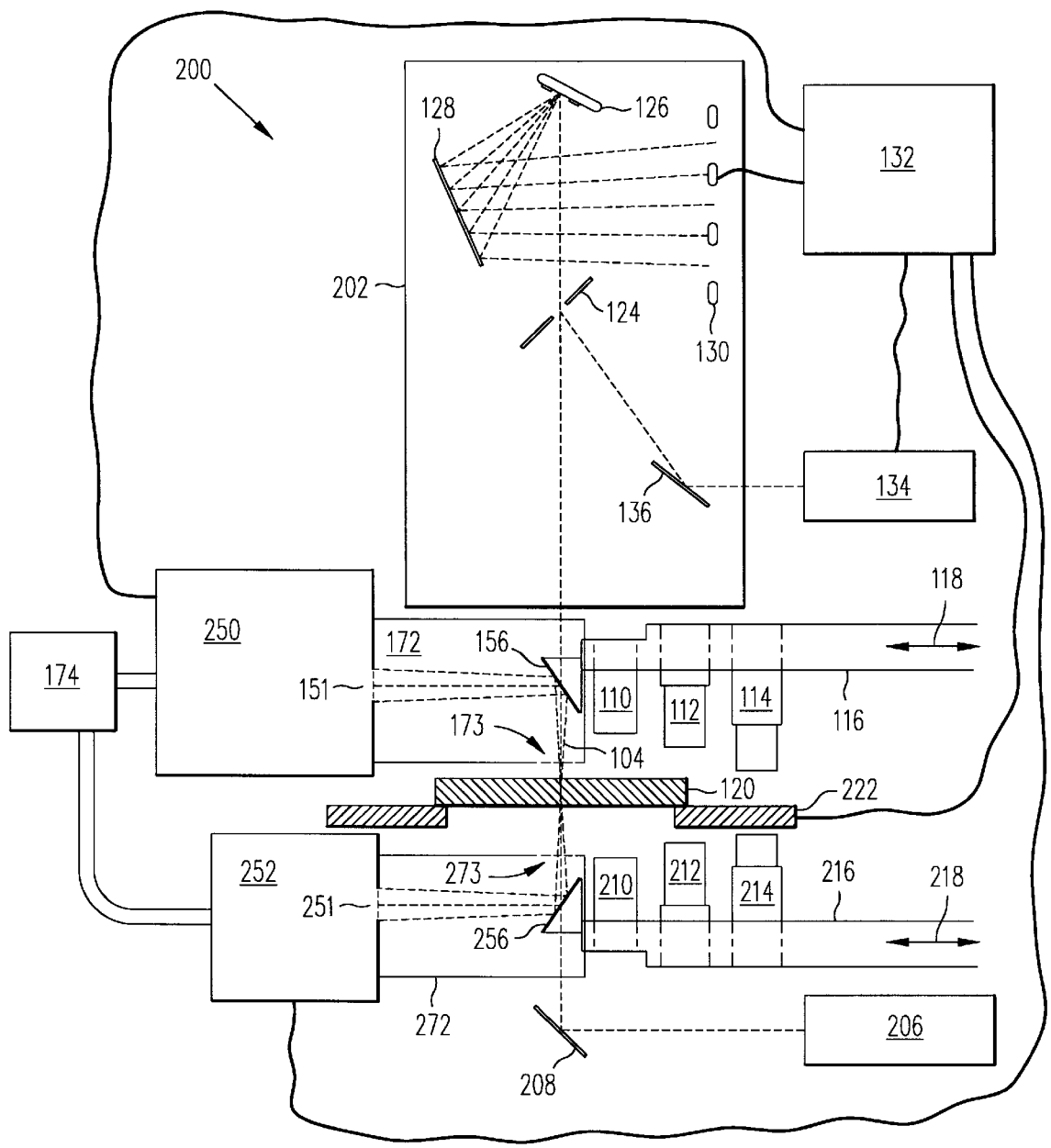
FIG. 7 shows a side view of a parfocal measuring instrument that includes an independent UV-NIR source and an independent IR source, both of which are used to illuminate the sample so that the spectrophotometer detector and spectrometer detector receive light transmitted through the sample.

In an other embodiment, light focused by an objective lens is transmitted through sample 120 and collected by a spectrophotometer (as shown in FIG. 7). Thus, information contained in the transmitted light that relates to the bulk and surface properties may also be measured.

As measuring systems have become automated in today's environment, parfocal measuring instrument 100 may be usable without any visual observation of sample 120 in the normal metrology cycle. However, to simplify setup and to allow a visual inspection of the area being analyzed, it is desirable to permit the viewing of the area being measured on sample 120 with an imaging device that is also parfocal with spectrophotometer 102 and FTIR spectrometer 150. The imaging device can be, by way of an example, a camera or a microscope ocular, along with appropriate intervening optical transfer elements such as lenses or mirrors. The imaging device may share optical elements with either the spectrophotometer 102 or the FTIR spectrometer 150 or may have its own independent optical axis.

Thus, as shown in FIG. 2, mirror 124 also reflects light to imaging device 134, such as a microscope ocular or camera by way of intervening mirror 136. The magnified image of an area of the sample, as viewed by imaging device 134, will have a "black hole" in the image's center caused by the hole in mirror 124. The black hole indicates the precise area on sample 120 that is being measured by spectrophotometer 102. Imaging device 134 may provide data to microprocessor 132, which selects the position of measurement by appropriately controlling stage 122. Precise selection of the position of measurement is thus facilitated. Of course, it should be understood that the placement of imaging device 134 may be varied through the use of appropriate lenses and/or mirrors, and if desired other types of imaging devices may be used. Further, multiple imaging devices can be used simultaneously. Thus, a camera may be used to provide data to microprocessor 132 while a microscope ocular simultaneously permits operator viewing.

As shown in FIG. 3, FTIR spectrometer 150 produces light that is reflected off mirror 156 and is focused on sample 120 along vertical axis 104. Because FTIR spectrometer 150 is parfocal with spectrophotometer 102, approximately the same area of sample 120 that is analyzed by spectrophotometer 102 can be analyzed by FTIR spectrometer 150. While FTIR spectrometer 150 is described in the present disclosure as a specular reflectance type spectrometer, it should be understood that a transmission type of spectrometer may also be used.

FIG. 4 shows a plan view of FTIR spectrometer 150, including mirror 156 connected to linear turret 116. The entrance pupil of objective lens 110 is also shown on linear turret 116. FTIR spectrometer 150 includes both the light source and detector in a combined unit. The source of FTIR spectrometer 150 is a Michelson interferometer that includes an IR source 152, a beam splitter 154, a stationary mirror 158, and a moving mirror 160. The IR source 152, which includes a collimator (not shown), generates parallel light having an infrared wavelength between approximately 2 $\mu$m to 20 $\mu$m, but wavelengths of up to 1 mm may be used if desired. A portion of the parallel light is reflected by beam splitter 154 to stationary mirror 158, which reflects the light back to beam splitter 154. Beam splitter 154 also transmits a portion of the light to moving mirror 160, which reflects the light back to beam splitter 154 as moving mirror 160 moves back and forth as indicated by arrow 164. For any given location of moving mirror 160, the light reflected by stationary mirror 158 and moving mirror 160 is combined so that the phase of the light is combined constructively, destructively, or somewhere in between creating a beam of multiple wavelengths and phases, which the change with time due to the movement of moving mirror 160.

A focusing mirror 162 reflects the combined light as a converging light beam 163 to mirror 156 positioned on linear turret 116. Light beam 163 is reflected downward by mirror 156 onto sample 120, as shown in FIG. 3, thereby generating measurement area 180. The total optical path of converging light beam 163 is approximately 8 in. Measurement area 180 has a diameter of approximately 8 mm, and is centered on vertical axis 104 (shown in FIG. 3). The light is either reflected by, absorbed by, or transmitted through sample 120. Light that is reflected off sample 120, i.e., diverging light beam 167, is reflected off mirror 156 and is received by detector 166 by way of intermediate focusing mirrors 168 and 170. The angles of reflection of converging and diverging light beams 163, 167 is as close to normal as possible while maintaining a separation between converging and diverging light beams 163, 167, i.e., the angle of the axes of converging and diverging light beams 163, 167 from normal in one embodiment are approximately 11 degrees.

Detector 166 is an infrared sensitive light detector and is used to measure the intensity of the light. The data acquired by detector 166 is analyzed by microprocessor 132 (shown in FIGS. 2 and 3) using a Fourier transform to obtain an intensity profile with respect to wavelength, thereby obtaining the desired quantitative information about measurement area 180 on sample 120. The programming of microprocessor 132 to analyze spectral data obtained from FTIR spectrometer 150 is well known to those of ordinary skill in the art.

Thus, both spectrophotometer 102 and FTIR spectrometer 150 produce measurement areas that are focused at essentially the location on sample 120. FTIR spectrometer 150, however, may produce a measurement area that is slightly different in size than the measurement area of spectrophotometer 102.

FIGS. 5A through 5C show plan and side views of the measurement areas of spectrophotometer 102 and FTIR spectrometer 150. As can be seen in FIG. 5A, measurement area 190, which represents the measurement area of FTIR spectrometer 150, is coincident with measurement area 192, representing the measurement area of spectrophotometer 102, and thus both measurement areas 190 and 192 share a common vertical axis 194. Consequently, measurement areas 190 and 192 are parcentric and/or parfocal.

FIG. 5B shows a side view of the sample 120 with common vertical axis 194. Where both measurement areas 190 and 192 are focused at the same position along vertical axis 194, i.e., at position 196, the measurement areas are parfocal. However, where one measurement area is focused at position 196 and the other measurement area is focused along the same vertical axis 194 at, e.g., position 198, the measurement areas are parcentric.

Moreover, as shown in FIG. 5C, measurement areas 190 and 192 may also have independent axes 191 and 193, respectively. Thus measurement areas 190 and 102 are not parcentric, but simply overlap. The term "overlap" includes overlapping or touching measurement areas. While overlapping measurement areas may not be as accurate as parcentric or parfocal measurement areas, overlapping measurement areas are nevertheless advantageous because substantially the same area on the sample is being measured by the metrology instruments thereby providing an adequate data correlation for many applications. Where greater accuracy of data correlation is required only a small movement of the sample will be required to place the sample in a parcentric or parfocal configuration, i.e., the sample will only need to move far enough to align the vertical axes of the measurement areas, which will be no more than the sum of the radii of the two measurement areas. Consequently, with parcentric, parfocal, or overlapping measurement areas, the different measurements may be made while the sample is maintained in approximately the same position. Moreover, the configuration of spectrophotometer 102 and FTIR spectrometer 150 advantageously minimizes the horizontal area occupied by measurement instrument 100.

While FIG. 4 shows detector 166 contained in the same unit as the IR source, it should be understood that other embodiments of the present invention may separate the source and detector of FTIR spectrometer 150. Moreover, if desired, a transmission type spectrometer may be used in an embodiment of the present invention, and thus light that is transmitted through sample 120 is received by the spectrometer. A transmission type spectrometer is shown in FIG. 7.

While spectrometer 150, as described in the present disclosure, may be considered a "microspectrometer", it should be understood that other types of spectrometers may also be used in accordance with the present invention. Thus the inclusion of small or large area capabilities, by the use of lenses or mirrors as part of the spectrometer's optical path, is an acknowledged and expected implementation within the scope of the present invention.

Because atmospheric water-vapor and carbon dioxide can cause major absorption peaks in FTIR spectra, purging of the atmospheric interferences along the FTIR optical path is performed. A purging gas supply 174 provides an inert gas, such as nitrogen ($N_2$) to FTIR spectrometer 150. The gas flows through FTIR spectrometer 150 and out aperture 151 (shown as a broken line) through which converging and diverging light beams 163 and 167 pass. The gas flows into a purging shroud 172, which guides the inert gas to mirror 156. Mirror 156 deflects the purging gas downward toward sample 120. The gas flows out aperture slot 173 (shown as a broken line in FIGS. 2 and 3) in the bottom of purging shroud 172 and over the measurement area on sample 120. Consequently, the purging gas flows through the entire optical path of FTIR spectrometer 152, including through IR source 152.

As shown in FIG. 2, linear turret 116 slides into purging shroud 172 when spectrophotometer 102 is used. As linear turret 116 slides into purging shroud 172, one or more of the objective lenses 110, 112, and 114 may extend out aperture slot 173, e.g., as shown in FIG. 2 only objective lens 114 extends out of aperture slot 173. The purging gas from gas supply 174 continues to flow through FTIR spectrometer 150 during the use of spectrophotometer 102. The continual flow of the purging gas permits the flow to remain in equilibrium, and thus, the total measurement cycle time may be reduced. Of course, if desired the purging gas can be used only when FTIR spectrometer 150 is used. However, the purging gas should be permitted to flow for a time sufficient to purge atmospheric interferences.

Figure 6:
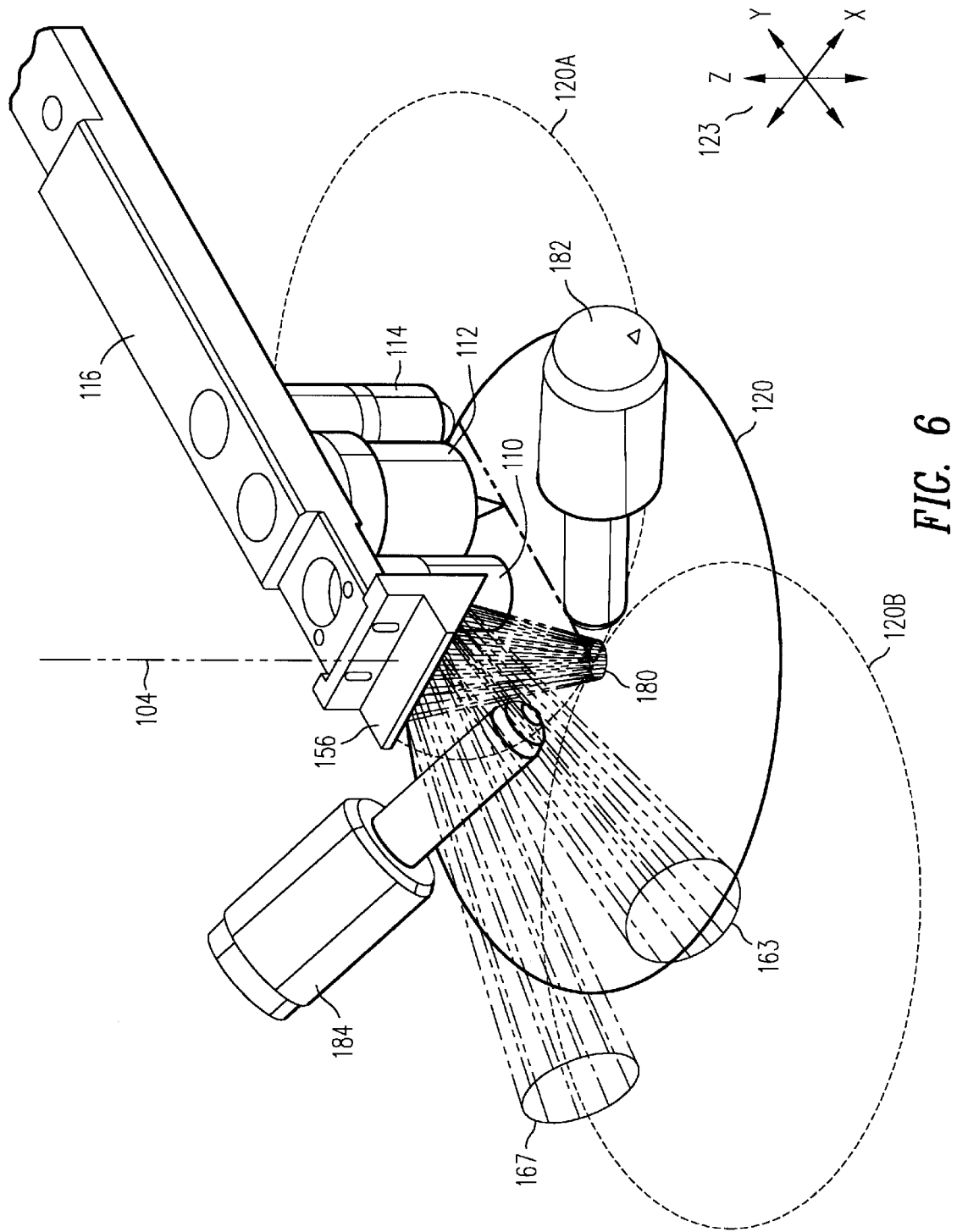
FIG. 6 shows a perspective view of a linear turret with objective lenses and a mirror.

FIG. 6 shows a perspective view of linear turret 116 with objective lenses 110, 112, and 114 along with mirror 156 (spectrophotometer 102 and FTIR spectrometer 150 are not shown in FIG. 6 for the sake of clarity). As shown in FIG. 6, converging light beam 163 and diverging light beam 167 are reflected off mirror 156 at measurement area 180 on sample 120. Stage 122 (not shown in FIG. 6) moves sample 120 in the X and Y directions as indicated by arrows 123, such that any desired area of sample 120 may be aligned with vertical axis 104. Thus, for example, sample 120 may be moved along the Y axis so that the edges of sample 120 may be tested as illustrated by broken lines 120A and 120B.

Of course, stage 122 may similarly move sample 120 along the X axis. Further, stage 122 may move sample in the Z direction as one method of altering the point of focus on stage 120.

FIG. 6 also shows portions of an ellipsometer illumination source 182 and detector 184, which may be used in conjunction with parfocal measuring instrument 100 if desired. Thus, additional measurement instruments may be used in conjunction with parfocal measurement instrument 100 without interfering with the measurements of either spectrophotometer 102 or FTIR spectrometer 150.

FIG. 7 shows a side view of a parfocal measuring instrument 200, which is similar to parfocal measuring instrument 100, as shown in FIG. 3, like designated elements being the same. However, parfocal measuring instrument 200 includes an independent UV-NIR source 206 and an independent IR source 252, both of which are used to illuminate sample 120. As shown in FIG. 7, IR source 252, such as a Michelson interferometer, produces a beam of converging light that is reflected by mirror 256 to illuminate sample 120. IR source 252 is shown connected to microprocessor 132 because microprocessor 132 must know the position of the moving mirror (not shown in FIG. 7) in the Michelson interferometer to perform the Fourier transformation. Sample 120 is positioned on a stage 222, which has a configuration to permit light to be transmitted through sample 120. The light that is transmitted through sample 120 is then collected by FTIR spectrometer 250. A second purging shroud 272 is used in conjunction with IR source 252 to eliminate atmospheric interferences that may occur along the optical path. Thus, gas supply 174 also feeds a purging gas to IR source 252. The gas flows out of IR source 252 through aperture 251 and into purging shroud 272. The gas is deflected by mirror 256 and out purging shroud 272 via aperture slot 273.

FIG. 7 shows parfocal measuring instrument 200 with mirrors 156 and 256 aligned with vertical axis 104. However, where a spectrophotometric measurement is desired, linear turret 216 moves with linear turret 116 to align one of objective lenses 210, 212, and 214 and one of the appropriate corresponding objective lenses 110, 112, and 114 with vertical axis 104. The UV-NIR source 206 produces light that is reflected by mirror 208 and is focused on sample 120 by the aligned objective lens. The light that is transmitted through sample 120 is then collected by spectrophotometer 202.

While FIG. 7 shows parfocal measuring instrument 200 with a transmission type spectrophotometer 202 and FTIR spectrometer 250, it should be understood that any combination of transmission and/or reflectance type spectrophotometers and spectrometers may be used in accordance with an embodiment of the present invention.

In addition, parfocal measuring instruments in accordance with an embodiment of the present invention may include spectrophotometers and FTIR spectrometers that measure light having different angles of incidence on the sample. FIGS. 8A, 8B, 8C, and 8D show different embodiments of a parfocal measurement instrument in accordance with the present invention where the signals being analyzed are either transmitted through the sample, reflected by the surface of the sample, or a combination of the two. As shown in FIGS. 8A, 8B, 8C, and 8D, the angles of incidence of the light differ between the spectrophotometer and spectrometer.

Figure 8A:
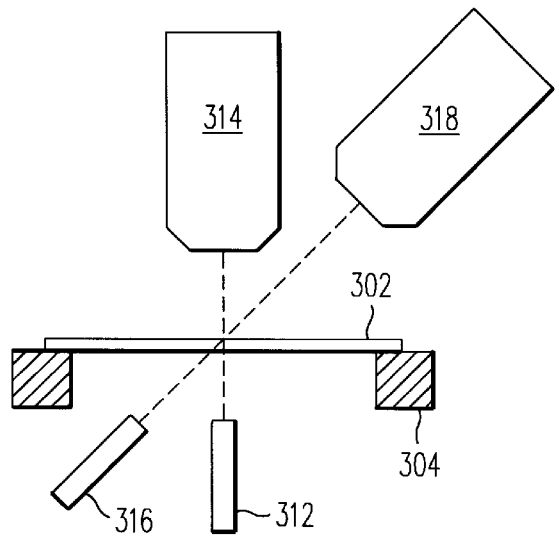
FIGS. 8A, 8B, 8C, and 8D show different embodiments of a parfocal measurement instrument in accordance with the present invention where the signals being analyzed are either transmitted through the sample, reflected by the surface of the sample, or a combination of the two and the angles of incidence of the light differ between the spectrophotometer and spectrometer.

FIG. 8A shows a UV-NIR source 312 that illuminates a transparent sample 302 and a spectrophotometer 314 that collects the transmitted light. Likewise, an IR source 316 illuminates the same measurement area of sample 302 and a FTIR spectrometer 318 collects the transmitted light. As shown in FIG. 8A, sample 302 is positioned on a stage 304 with a configuration permitting the transmission of light through sample 302. Spectrophotometer 314 and spectrometer 318 are parfocal as the two devices are focused on the same measurement area on sample 302 despite having different angles of incidence.

Figure 8B:
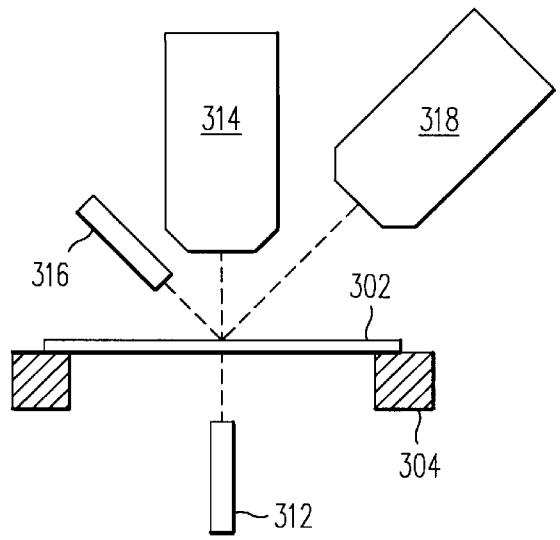

FIG. 8B shows UV-NIR source 312 illuminating transparent sample 302, while spectrophotometer 314 collects the transmitted light. IR source 316 illuminates sample 302, and FTIR spectrometer 318 collects the light from IR source 316 that is reflected off sample 302.

Figure 8C:
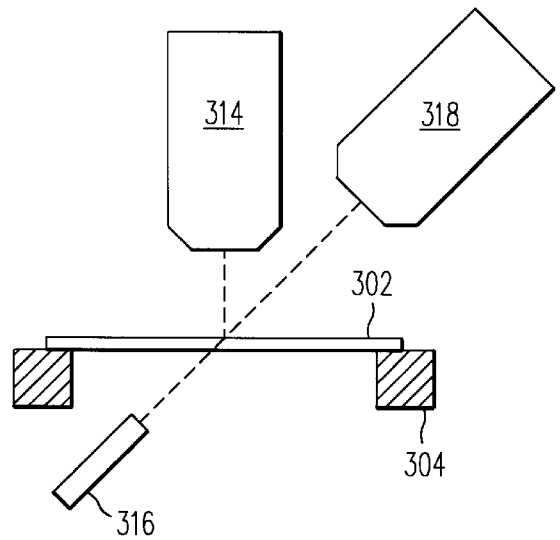

In FIG. 8C, spectrophotometer 314 includes a UV-NIR source (not shown) that illuminates sample 302. Spectrophotometer 314 collects the light that is reflected off sample 302. IR source 316 illuminates sample 302 and FTIR spectrometer 318 collects the transmitted light.

Figure 8D:
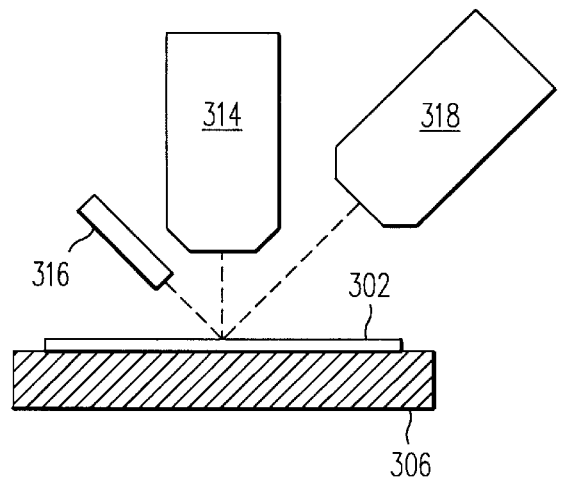

In FIG. 8D, spectrophotometer 314 again includes a UV-NIR source (not shown) that illuminates sample 302. Spectrophotometer 314 collects the light that is reflected off sample 302. IR source 316 illuminates sample 302, and FTIR spectrometer 318 collects the light from IR source 316 that is reflected off sample 302. Because the light from both UV-NIR source 312 and IR source 216 is reflected by sample 302, sample 302 may be placed on a solid stage 306 without concern to permitting the transmission of the light through sample 302.

Although the present invention has been described in considerable detail with reference to certain versions thereof, other versions are possible. For example, while the use of spectrophotometers and spectrometers are described in the present disclosure, it should be understood that the use of spectrophotographs and spectrographs may alternatively be used to produce graphical results. Additionally, while linear turret 116 is described as moving in a linear fashion, it should be understood that other configurations, such as a rotating turret may be used in another embodiment. Further, transmission and reflectance type spectrophotometers and spectrometer, as well as microspectrophotometers and microspectrometers, may be used in any combination in accordance with the present invention. Additional measuring instruments, such as an ellipsometer, may also be used in conjunction with the present invention. Therefore, the spirit and scope of the appended claims should not be limited to the description of the versions depicted in the figures.

What is claimed is:

1. A measurement instrument for the characterization and measurement of surface, thin-film, and bulk properties of a sample, said measuring instrument comprising:

a spectrophotometer measuring a first area of said sample; and a spectrometer measuring a second area of said sample;

wherein said first area of said sample and said second area of said sample overlap, said spectrophotometer measures said first area of said sample and said spectrometer measures said second area of said sample with said sample maintained in approximately the same position.

2. The measurement instrument of claim 1, wherein said spectrometer is a Fourier Transform Infrared spectrometer.

3. The measurement instrument of claim 1, wherein said spectrophotometer uses light with wavelengths in the range of 0.2 $\mu$m through 1.5 $\mu$m.

4. The measurement instrument of claim 1, wherein said spectrophotometer and said spectrometer are parcentric.

5. The measurement instrument of claim 1, wherein said spectrophotometer and said spectrometer are parfocal.

6. The measurement instrument of claim 1 further comprising:

a first beam directing element for directing the beam for said spectrometer and a second beam directing element for directing the beam for said spectrophotometer, said first beam directing element and said second beam directing element mounted on a common movable member;

wherein the use of said spectrometer and said spectrophotometer is selectable by moving said common movable member to select one of said first beam directing element and said second beam directing element.

7. The measurement instrument of claim 6, wherein said first beam directing element comprises:

a first mirror for directing the beam from a spectrometer light source toward said sample; and a second mirror for directing the beam from said sample toward a spectrometer detector;

wherein said second beam directing element comprises:

a first lens for directing the beam from a spectrophotometer light source toward said sample; and a second lens for directing the beam from said sample toward a spectrophotometer detector.

8. The measurement instrument of claim 7, wherein:

said first mirror and said second mirror are the same mirror, said beam from said spectrometer light source is a first incident beam and said beam from said sample toward said spectrometer detector is a first reflected beam; and said first lens and said second lens are the same lens, said beam from said spectrophotometer light source is a second incident beam and said beam from said sample toward said spectrophotometer detector is a second reflected beam.

9. The measurement instrument of claim 7, further comprising:

a second common movable member upon which is mounted said first mirror and said first lens, said second common movable member is positioned on the opposite side of said sample from said spectrometer detector and said spectrophotometer detector;

wherein said beam from said spectrometer light source is a first incident beam and said beam from said sample toward said spectrometer detector is a first transmitted beam, and said beam from said spectrophotometer light source is a second incident beam and said beam from said sample toward said spectrophotometer detector is a second transmitted beam.

10. The measurement instrument of claim 6, further comprising a plurality of beam directing elements for directing the beam for said spectrophotometer, said plurality of beam directing elements mounted on said common movable member.

11. The measurement instrument of claim 1, further comprising:

an imaging apparatus for locating a desired feature on said sample, and means for moving said sample to place said desired feature at a desired position within the field of view of said imaging apparatus;

wherein said imaging apparatus is parfocal with said spectrophotometer and said spectrometer.

12. The measurement instrument of claim 11, wherein:

said imaging apparatus is a camera; and said means for moving said sample is a microprocessor coupled to said camera and a stage upon which said sample is mounted, said microprocessor controlling the position of said stage.

13. The measurement instrument of claim 11, wherein said imaging apparatus comprises a plurality of viewing instruments for simultaneously viewing said desired feature on said sample.

14. The measurement instrument of claim 1, further comprising:
   a purging shroud coupled to said spectrometer, said purging shroud directing a purging gas along the spectrometer optical path.

15. An apparatus for measuring characteristics of a sample, said apparatus comprising:
   a stage for mounting said sample, said stage movable to position said sample at a desired location;
   a first light source producing light with wavelengths between the ultraviolet and near infrared range, said light being focused at a first measurement area on a surface of said sample;
   a spectrophotometer receiving said light with wavelengths between ultraviolet and near infrared from said first measurement;
   a second light source producing light with wavelengths in the infrared range, said light being focused at a second measurement area on a surface of said sample; and
   a spectrometer receiving said light with wavelengths in the infrared range from said second measurement area;
   wherein said first measurement area and said second measurement area are coincident while holding said stage essentially stationary.

16. The apparatus of claim 15, wherein said light with wavelengths between ultraviolet and near infrared from said first measurement received by said spectrophotometer is light reflected by said sample and wherein said light with wavelengths in the infrared range from said second measurement area received by said spectrometer is light reflected by said sample.

17. The apparatus of claim 15, wherein said light with wavelengths between ultraviolet and near infrared from said first measurement received by said spectrophotometer is light transmitted through said sample and wherein said light with wavelengths in the infrared range from said second measurement area received by said spectrometer is light transmitted through said sample.

18. The apparatus of claim 15, wherein said light with wavelengths between ultraviolet and near infrared from said first measurement received by said spectrophotometer is light transmitted through said sample and wherein said light with wavelengths in the infrared range from said second measurement area received by said spectrometer is light reflected by said sample.

19. The apparatus of claim 15, wherein said light with wavelengths between ultraviolet and near infrared from said first measurement received by said spectrophotometer is light reflected by said sample and wherein said light with wavelengths in the infrared range from said second measurement area received by said spectrometer is light transmitted through said sample.

20. The apparatus of claim 15 further comprising:
   a first beam directing element mounted on a common movable member, said first beam directing element for directing said light with wavelengths between ultraviolet and near infrared from said first measurement area received by said spectrophotometer;
   a second beam directing element mounted on said common movable member, said second beam directing element for directing said light with wavelengths in the infrared range from said second measurement area received by said spectrometer;
   wherein said common movable member is moved to select one of said first beam directing element and said second beam directing element.

21. The apparatus of claim 20, wherein said first beam directing element is an objective lens, said second beam directing element is a mirror, and said common movable member is a linear turret.

22. A method of measuring the surface, thin-film, and bulk properties of a sample, said method comprising:
   illuminating a first area of said sample with light having a first wavelength;
   detecting the light having a first wavelength from said sample with a spectrophotometer;
   illuminating a second area of said sample with light having a second wavelength; and
   detecting the light having a second wavelength from said sample with a spectrometer;
   wherein said first area of said sample and said second area of said sample overlap and wherein said illuminating a first area and said illuminating a second area are performed with said sample maintained in approximately the same position.

23. The method of claim 22, wherein said first wavelength is a portion of wavelengths ranging from 0.2 $\mu$m through 1.5 $\mu$m, and wherein said second wavelength is between 2 mm and 1 mm.

24. The method of claim 23, wherein said detecting the light having a first wavelength from said sample comprises detecting at least one of light reflected from said sample and light transmitted through said sample.

25. The method of claim 24, wherein said detecting the light having a second wavelength from said sample comprises detecting at least one of light reflected from said sample and light transmitted through said sample.

26. The method of claim 22, further comprising moving a common movable member upon which is mounted a first beam directing element and a second beam directing element, wherein moving said common movable member places at least one of said spectrophotometer and spectrometer in alignment with said respective first area and said second area.

* * * * *